Patented Apr. 21, 1953

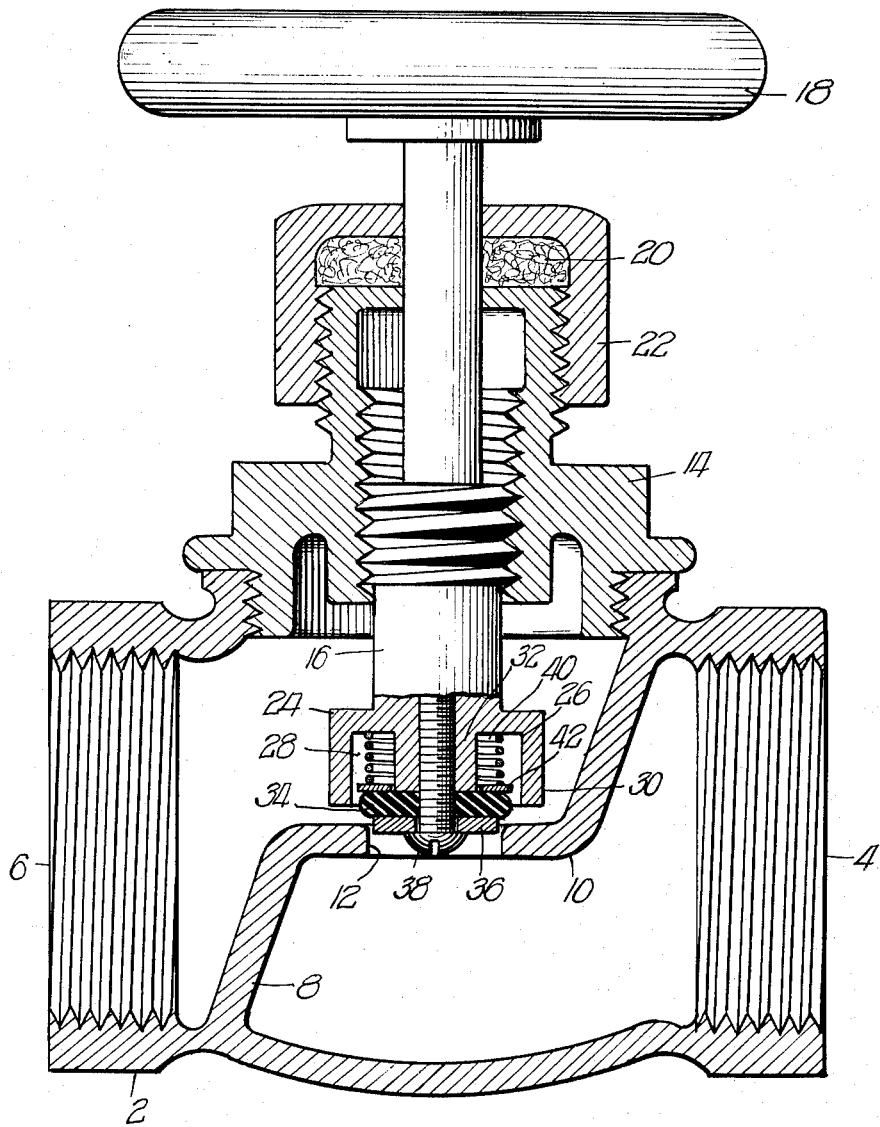

2,635,846

UNITED STATES PATENT OFFICE 2,635,846

FLUID VALVE CONSTRUCTION

Thomas R. Smith, Newton, Iowa, assignor to The Maytag Company, Newton, Iowa, a corporation of Delaware Application January 12, 1949, Serial No. 70,572

4 Claims. (Cl. 251—27)

The present invention relates to fluid valve constructions and more particularly to a novel valve seat seal assembly therefor.

Among the objects of the invention is to provide a novel valve seat seal assembly for a fluid valve construction embodying a sealing member and which operates on the principle of utilizing the pressure of the fluid in the valve construction to maintain the seal when the sealing member is in its closed position.

Another object of the invention is to provide a valve construction embodying a novel valve seat seal assembly as immediately hereinabove described which further includes means for substantially restricting the flow of fluid in the valve construction during the time when the valve seat seal assembly is being seated and unseated to protect the sealing member against extrusion by the fluid pressure, thus providing an assembly which maintains its effective operating characteristics over an extended period of time.

Still another object of the present invention is to provide a valve construction embodying a novel valve seat seal assembly which includes a positive stop means as a characteristic feature thereof in addition to those above enumerated to limit the closing action of said assembly to prevent excessive squeezing and crushing of the sealing member.

The invention further comprehends a valve seat seal assembly of the type hereinbefore defined in which resilient means is incorporated therein for the purpose of assuring proper flexing of the sealing member into sealing relation with its seat under those conditions where there is very little pressure drop through the valve.

Other objects, features, capabilities and advantages are comprehended by the invention, as will later appear and as are inherently possessed thereby.

Referring to the drawing:

Figure 1 is a longitudinal vertical cross-sectional view disclosing a valve assembly embodying the present invention.

Referring now more in detail to the drawing, an embodiment selected to illustrate the invention is disclosed as comprising a valve assembly including a valve body 2 having an intake 6 and an outlet 4 which are internally threaded to provide means whereby the valve body may be connected to inlet and outlet conduits. Interposed between the inlet and outlet openings of the valve body is a partition 8 having a centrally disposed seat 10 formed with an orifice or opening 12 for the passage of a fluid under pressure from the intake to the outlet side of the valve body. Threadedly mounted in the valve body 2 is a bonnet 14 in which is threadedly mounted a plunger 16 at the upper end of which is a hand wheel or handle 18, whereby the plunger 16 may be readily adjusted with respect to the opening 12. A seal 20, held in place by a cap 22, is provided to secure a fluid-tight joint between the bonnet and the plunger 16.

The plunger 16 has an enlarged head 24 formed at its lower end and in the face of which is provided a recess 26 having an annular portion 28 of substantial depth, which is defined circumferentially by the annular flange 30. The central portion of this recess 26 is defined by the abutment 32 which terminates axially and inwardly a short distance from the end of the flange 30. A sealing member 34 is secured in seating relation to the abutment 32 by a retaining element 36 and a screw 38.

The present invention contemplates the use of a valve seal or sealing element 34 of flexible but non-resilient material such as hard rubber, "Teflon," "Nylon," and the like, or of resilient material such as natural or synthetic rubber and the like. The invention is predicated upon the idea of utilizing the pressure on one side of the valve seat for flexing or moving the valve seal or sealing element into seating relation with the valve seat to secure a complete cut-off of flow of fluid through the orifice or opening in the valve seat.

In the illustrated embodiment of the invention, the orifice 12 is of circular formation and the seal retainer 36 is of similar formation and of a diameter slightly less than the diameter of the opening 12. The valve seal 34 is in the form of a disc provided with a rounded or curved marginal edge and has a diameter somewhat greater than the diameter of the opening 12, whereby the same is adapted to be flexed into seating relation with the marginal edge portion of the opening 12.

There are times where the pressure drop may be insufficient properly to seat the seal 34 with respect to the seat 10, in which case a coil spring 40 is provided. The spring 40 is disposed within the annular portion 28 of the recess 26, the same at one end abutting the end of the recess and at the other end abutting a washer 42 interposed between the same and the outer marginal portion of the sealing member 34. This coil spring 40 maintains a constant pressure on the sealing member 34, tending to cause the marginal portion thereof to flex into sealing relation with the seat 10 as the plunger 16 is moved downwardly into closed position to cut off the flow of fluid through the opening 12. Instead of using the coil spring as shown in this embodiment, any type of spring, such as a curved spring washer or a Bellville washer or washers may be used for flexing the marginal portion of the sealing member into seating relation with the seat 10. The recess 26 formed in the enlarged head 24 of the plunger is defined by the annular flange or abutment 30 spaced radially from the valve seal 34 and which constitutes a stop engageable with the seat 10 to limit the movement of the plunger 16 with respect to the seat 10 when the sealing member 34 is in its full closed position, thus protecting the sealing member and preventing the same from being crushed or damaged. The retainer member 36 functions to protect the sealing member from extrusion when the valve is in closed position.

While I have herein described and shown an illustrative embodiment of the invention, it is to be understood that the invention is not limited thereto but may comprehend other constructions, arrangements of parts, details and features without departing from the spirit of the invention.

It is claimed:

1. In a sealing device, the combination of a member having an opening for passage of a fluid therethrough under pressure, a closure member for said opening provided with a portion adapted to enter and substantially restrict the flow of fluid through said opening when said member is moved toward its closed position, a sealing element carried by one of said members on the high pressure side relative to said portion, said sealing element having a marginal edge portion adapted to flex into contacting relation with the other of said members under the action of fluid pressure after said portion enters the opening for completely sealing said opening to prevent further flow therethrough, resilient means carried by said one of said members and reacting against the same and the marginal edge portion of said sealing element for urging said marginal edge portion into said contacting relation with said other of said members, and an enlarged abutment carried by said closure member providing a stop engageable with the other of said members about said opening after said sealing element is moved into contacting relation with said other of said members.

2. In a sealing device, the combination of a member having an opening for passage of a fluid therethrough under pressure, a plunger provided with a portion on the pressure side of said opening adapted to enter and substantially restrict the flow of liquid through said opening when said plunger is moved toward its closed position, a sealing disc carried by said plunger on the high pressure side of said opening, said sealing disc having an outer marginal edge portion adapted to flex into contacting relation with the surface around said opening under the action of fluid pressure after said portion enters the opening for completely sealing said opening to prevent further flow therethrough, spring means carried by said plunger and reacting against the same and the outer marginal edge portion of said sealing disc for urging said outer marginal edge portion into contacting relation with the surface around said opening, and an enlarged abutment on said plunger providing a stop engageable with said member about said opening after said sealing disc has contacted the surface around said opening.

3. In a sealing device, the combination of a member having an opening for passage of a fluid therethrough under pressure, a plunger provided with a removable seal retaining portion on the high pressure side of said opening adapted to enter and substantially restrict the flow of fluid through said opening when said plunger is moved toward its closed position, a sealing disc carried by said plunger on the pressure side of said opening and secured in position by said retaining portion, said sealing disc having an outer marginal edge portion adapted to flex into contacting relation with the surface around said opening under the action of fluid pressure after said portion enters the opening for completely sealing said opening to prevent further flow therethrough, said plunger having a portion surrounding said sealing disc providing a stop engageable with said member about said opening after said sealing disc has contacted the surface around said opening, and spring means carried by said plunger and reacting against the same and the outer marginal edge portion of said sealing disc for urging said outer marginal edge portion into contacting relation with the surface around said opening.

4. In a valve, the combination of a valve body having inlet and outlet means, said body having a member disposed between said means provided with an opening for passage of a fluid therethrough under pressure, a plunger mounted in said body for relative movement with respect to said member and being provided with a portion on the high pressure side of said opening adapted to enter and substantially restrict the flow of fluid through said opening when said plunger is moved toward its closed position, a sealing disc carried by said plunger on the pressure side of said opening, said sealing disc having an outer marginal edge portion adapted to flex into contacting relation with the surface around said opening under the action of fluid pressure after said portion enters the opening for completely sealing said opening to prevent further flow therethrough, spring means carried by said plunger and reacting against the same and the outer marginal edge portion of said sealing disc for urging said outer marginal edge portion into contacting relation with the surface around said opening, and an enlarged abutment on said plunger providing a stop engageable with said member about said opening after said sealing disc has contacted the surface around said opening.

THOMAS R. SMITH.

References Cited in the file of this patent

UNITED STATES PATENTS

| Number | Name | Date |
|---|---|---|
| 1,785,259 | Hickerson | Dec. 16, 1930 |
| 1,861,420 | Mahan | May 31, 1932 |
| 2,107,200 | Kennon | Feb. 1, 1938 |
| 2,148,850 | Deakins | Feb. 28, 1939 |
| 2,217,880 | Woodson | Oct. 15, 1940 |
| 2,408,006 | Smith | Sept. 24, 1946 |
| 2,417,242 | Eckel | Mar. 11, 1947 |
| 2,431,437 | Van Der Werff | Nov. 25, 1947 |
| 2,445,505 | Ashton | July 20, 1948 |
| 2,482,198 | Melichar | Sept. 20, 1949 |